Patented Apr. 24, 1951

2,550,054

UNITED STATES PATENT OFFICE 2,550,054

TREATMENT OF OIL-BASE DRILLING FLUIDS

Paul W. Fischer, Long Beach, Calif., assignor to Union Oil Company of California, Los Angeles, Calif., a corporation of California No Drawing. Application February 3, 1949, Serial No. 74,495

12 Claims. (Cl. 252—8.5)

This invention relates to the treatment of oil-base drilling fluids employed in the drilling of oil and gas wells, and in particular concerns a method of treating such fluids for the removal of water.

In drilling oil and gas wells by rotary drilling methods, a hollow drill pipe, known as a drill stem, having a bit attached to its lower end is extended downwardly through the well bore and rotated while the bit is pressed against the working face in the formation at the bottom of the bore. The action of the rotating bit grinds away the formation as the drilling progresses. During the drilling a fluid body, commonly termed a drilling mud, is continuously circulated downwardly through the hollow drill stem, through the bit and against the working face of the bore, and then upwardly toward the surface through the annular space between the drill stem and the wall of the bore hole. The drilling fluid serves a number of purposes among which are cooling and lubricating the drill bit, suspending and removing cuttings from the bore hole, and preventing the flow of fluids from the formation into the bore hole by applying a hydrostatic pressure to the formation.

The drilling fluids commonly used in drilling oil and gas wells in general fall into one of two classes: water-base fluids and oil-base fluids. The former essentially comprise aqueous dispersions of clay or the like to which a variety of chemical agents may be added for controlling the physical properties of such dispersions. The present invention, however, is concerned with drilling fluids of the oil-base type, which type broadly comprises an oil base and minor proportions of agents adapted to control the physical properties of the oil. For the most part oil-base drilling fluids derive their viscosity characteristics from the vehicle itself, i. e., the oil, rather than from suspended solid materials such as clay and the like as in the case with water-base fluids. Consequently, the oil-base drilling fluids do not ordinarily contain substantial quantities of suspended solids of this nature. They may, however, contain a minor proportion of high density solids, e. g., barytes, whiting, etc., which serve to increase the density of the fluid.

In general, oil-base drilling fluids are employed in preference to water-base fluids in cases where it is undesirable to introduce water into the well bore because of the deleterious effects it may have on the producing formation. Thus, in certain producing oil fields, restrictions have been set up requiring that the drilling fluids employed contain only a small proportion, e. g., 5–10 per cent of water. However, in many instances where oil-base drilling fluids are employed for the express purpose of preventing water ingress into the producing formation, such purpose is not achieved since water becomes introduced into the drilling fluid at points where the bore traverses a water-bearing formation. Such water emulsifies with the drilling fluid and rapidly reaches a concentration capable of seriously damaging the producing formation. Oil-base drilling fluids which have become contaminated with water in this manner no longer fulfill their purpose and must be discarded or physically treated for the removal of water.

It is an object of the present invention to provide an improved method for treating water-contaminated oil-base drilling fluids for the removal of water.

Another object is to provide a method for removing or reducing the water content of water-contaminated oil-base drilling fluids by chemical means.

A further object is to provide a method whereby water may be removed from water-contaminated oil-base drilling fluids without deleteriously affecting the desirable properties of such fluids.

Other objects will be apparent from the following detailed description of the invention, and various advantages not specifically referred to herein will occur to those skilled in the art upon employment of the invention in practice.

I have found that the above and related objects may be realized in a process whereby oil-base drilling fluids which have become contaminated with an undesirable amount of water, either as a result of coming in contact with water-bearing formations during the drilling operation or from outside sources, are treated with a water-soluble alkaline-earth metal salt such as calcium chloride. Such treatment effects a demulsification of the drilling fluid with the result that a large proportion of the water separates as a subnatant layer which may be drawn off and discarded and the drilling fluid may be returned to use. Such treatment does not materially alter the physical properties of the drilling fluid, e. g., viscosity, gel strength, rate of gelling, etc. I have further found that the demulsification of water-contaminated oil-base drilling fluids in this manner is effective only in the presence of suspended solids such as are usually present in oil-base drilling fluids as weighting agents. Accordingly, when applying the method of the invention to water-contaminated oil-base drilling fluids which do not contain any substantial quantity of suspended solids, it is first necessary to suspend a solid material in the fluid prior to its treatment according to the invention. The invention thus comprises the treatment of water-contaminated oil-base drilling fluids containing suspended solids with a water-soluble alkaline earth metal salt to effect the separation of water therefrom.

The process of the invention is applicable to any oil-base drilling fluid which normally contains little water other than that incidental with the components of the fluid. Such drilling fluids in general comprise a major proportion, e. g. 70–90 per cent, of an oil-base which is usually of petroleum origin, e. g. crude petroleum, topped crude, distillates of lubricating viscosity, fuel oil, kerosene, naphtha, and low viscosity tars and asphalts. Usually a mixture of such petroleum fractions is employed to secure the desired viscosity characteristics. In addition to the oil-base, soaps or soap-forming materials are usually included in minor proportion, e. g., 1–10 per cent, for the purpose of aiding in the suspension of the cuttings produced during drilling as well as in the suspension of any solid components of the drilling fluid itself. Such solid components may include minor proportions, e. g. 0.5–5 per cent of hydratable clays and the like which serve to increase the gel strength of the fluid. They may also include minor proportions, e. g. 2–30 per cent, of high density solids such as barytes, whiting, finely divided heavy metals and heavy metal oxides, etc. which serve to increase the overall density of the fluid and thus provide greater hydrostatic head within the bore hole. Other minor components of the fluid may include stabilizing agents, sedimentation inhibitors, and various conditioning agents adapted to control or modify various properties of the fluid. All of such drilling fluids, regardless of the many minor components which they may optionally include have a common characteristic in that when they come in contact with water such as, for example, may enter the well bore from water-bearing formations penetrated by the bore, they form relatively stable emulsions of the water-in-oil type. The process of the invention is directed towards the breaking of such emulsion so that the water may be readily separated and the drilling fluid returned to its original substantially non-aqueous condition.

The water-soluble alkaline earth metal salt employed in treating water-contaminated oil-base drilling fluids according to the invention is preferably calcium chloride, although other water-soluble salts of calcium as well as those of magnesium, barium, and strontium may be employed. Such salts may be employed in the form or more or less concentrated aqueous solutions, e. g., from about 40 per cent up to the limit of their aqueous solubility, but are more preferably employed in solid form. Solid calcium chloride is preferred by reason of its economy and its efficiency as a treating agent.

As previously mentioned, the process of the invention requires that the oil-base drilling fluid subjected to the treatment contain an appreciable amount, e. g. 2–30 per cent, of suspended solids. The manner in which such suspended solids cooperate with the alkaline earth metal salt in effecting the separation of water from the drilling fluid is not readily apparent but it is believed that under the conditions prevailing the individual solid particles adsorb water and carry it out of the continuous oil phase as they settle. The invention, however, is not limited by any theory concerning the mechanism by which it operates. Usually the fluid will normally contain a sufficient quantity of suspended solids in the form of weighting agents, but in instances where the fluid to be treated is substantially free of solids it is necessary to suspend from about 2 to about 30 per cent by weight of a finely-divided solid material in the fluid prior to its treatment with the alkaline earth metal salt. Such added solid need not be a high density material of the nature of a weighting agent, however, but may be of the nature of sand, clay, common loam, finely divided stone, etc. Inasmuch as such material is settled out of the fluid and discarded along with the water it is preferable to employ as cheap and readily available material as possible.

In treating a water-contaminated oil-base drilling fluid according to the process of the invention, the alkaline earth metal salt is employed in an amount representing from about 0.5 to about 10 per cent of the weight of fluid being treated. The treatment may be carried out in any suitable vessel or tank or even in an open pit adjacent the drilling operation, and merely involves the addition of the alkaline earth metal salt to the fluid with the aid of agitation as with a "mud gun" or other suitable device to insure uniform mixing of the alkaline earth metal salt and the fluid. Alternatively, the salt may be contained in a perforate container, such as a wire basket, located at some convenient point along the stream of circulating fluid, as for example at the shaker screen, so that it gradually becomes dissolved in the fluid during its course of use. The fluid is then allowed to stand in a quiescent state for some time, e. g. 6–15 days, to permit the water and suspended solids to settle out, after which the supernatant oil layer is decanted off and returned to use. When, as is usually the case, the drilling fluid normally contains suspended solids as weighting agents, it is necessary that such agents be added to the oil in the usual manner before its return to drilling operations since, as previously explained, the water separation treatment requires the settling of at least part of the suspended solids which were present in the oil prior to the treatment. If desired, the solids which settle out during the treatment may be recovered and dried by heating or merely by exposure to the air and again dispersed in the oil to fulfill their original function as weighting agents or the like.

The following examples will illustrate the practice of the invention and present quantitative data demonstrating several of the advantages thereof. However, they are not to be construed as limiting the invention.

*Example I*

An unweighted oil-base drilling fluid was prepared to provide the following composition:

|  | Parts by Weight | Per cent by Weight |
| --- | --- | --- |
| Light Domestic Fuel Oil | 26,410 | 80.0 |
| Domestic Diesel Fuel | 3,915 | 11.8 |
| Sodium Rosin Soap | 2,100 | 6.6 |
| Hydrated Lime | 210 | 0.6 |
| Wyoming Bentonite (Aquagel) | 210 | 0.6 |
| Water | 140 | 0.4 |
|  | 32,985 | 100.0 |

The light domestic fuel oil was a petroleum distillate having an API gravity of 14.5°, a flash point of 170° F. and a viscosity of 36 seconds SSF at 122° F. The domestic Diesel fuel was a petroleum distillate of about 400°–720° F. boiling range, having an API gravity of 31.0°, a flash point of 180° F. and a viscosity of 40 seconds SUS at 100° F. This composition was made up by suspending the finely-divided lime in the Diesel fuel after which the sodium rosin soap was added with vigorous stirring. The bentonite and water were then mixed and added to the soap suspension with thorough agitation. Finally the fuel oil was added slowly with stirring to obtain a homogeneous composition. Such composition is typical of unweighted oil-base drilling fluids. It was then artifically contaminated by adding 15 per cent by weight of water. The contaminated fluid had a Marsh viscosity of 124 seconds at 115° F. and weighed 59 lbs./cu. ft.

A typical weighted drilling fluid was prepared by taking a portion of the above unweighted drilling fluid and adding 400-mesh whiting until it had a weight of about 68 lbs./cu. ft. This weighted fluid was likewise artificially contaminated by the addition of 15 per cent by weight of water.

Each of the above drilling fluids was divided into two portions and each portion was placed in a container. To one of the portions of each fluid there was then added 3.0 per cent by weight of finely-divided solid calcium chloride dihydrate and the mixture was stirred to obtain a uniform composition. The remaining portion of each fluid was untreated and served as a blank sample. The treated sample of the weighted and unweighted fluids, along with the respective blanks were then allowed to stand for 10 days during which time separation into two layers occurred. In each case the upper oil layer was decanted off and the water determined by ASTM procedure. The following data were obtained:

ASTM water, per cent
Unweighted fluid, blank _____ 9.4
Unweighted fluid, CaCl₂-treated _____ 9.2
Weighted fluid, blank _____ 7.0
Weighted fluid, CaCl₂-treated _____ 2.2

These data clearly indicate the efficacy of calcium chloride in separating water from the fluids, and further demonstrate the effect of the presence of suspended solids. In the unweighted untreated drilling fluid, approximately 37 per cent of the contaminating water separated upon mere standing, and the separation of only an additional 1.3 per cent was effected by the calcium chloride treatment. With the weighted mud, however, the separation upon standing alone was about 53 per cent; and the calcium chloride treatment effected the separation of an additional 32 per cent of the water. Thus, treatment of a water-contaminated drilling fluid with calcium chloride in the presence of suspended solids effected an overall reduction in water content of about 85 per cent, whereas similar treatment in the absence of suspended solids resulted in the separation of only about 38 per cent of the water. In the case of the treatment carried out in the presence of suspended solids, 75 per cent of the fluid subjected to the treatment was recovered as the upper layer containing only 2.2 per cent of water.

*Example II*

An oil-base drilling fluid similar in composition to the weighted fluid described in Example I and contaminated with water to the extent of 15 per cent was treated with several salts and salt solutions as well as with two commercial demulsifying agents as described above. The treated samples were allowed to stand for 10 days after which the upper oil layers were decanted and their water content determined by ASTM procedure. The following results were obtained:

| Treatment | | Water Content of Oil |
|---|---|---|
| Agent | Amount | |
| | Per cent | Per cent |
| Saturated aqueous NaCl | 6.0 | 12.0 |
| 50% aqueous Al₂(SO₄)₃·18H₂O | 6.0 | 18.0 |
| 50% aqueous CaCl₂·2H₂O | 6.0 | 7.0 |
| Solid NaCl | 3.0 | 8.4 |
| Solid Al₂(SO₄)₃·18H₂O | 3.0 | 11.4 |
| Solid CaCl₂·2H₂O | 3.0 | 2.2 |
| "Tretolite A-1" | 0.1 | 13.0 |
| "Tretolite T-43" | 0.1 | 13.2 |

These data demonstrate that both sodium chloride and aluminum sulfate, both of which are commonly known demulsifying agents, are ineffective in separating water from oil-base drilling fluids. The commercial demulsifying agents, which were complex organic products commonly employed in such concentration to break petroleum emulsions, were likewise ineffective. The data also show that solid calcium chloride is more effective than a concentrated calcium chloride solution although the latter is effective to a considerable extent.

*Example III*

Two samples of the water-contaminated weighted oil-base drilling fluid employed in Example II were treated with 3.6 per cent by weight of solid calcium chloride and with 6.5 per cent by weight of 50 per cent aqueous calcium chloride, respectively. A third untreated sample served as a blank. Each of the samples was allowed to stand for 24 hours after which the following physical properties were determined:

| Treatment | Fluid Loss 15 min. | Viscosity[1] at 115° F. | Weight[2] | | Gel Strength, lbs./100²ft. |
|---|---|---|---|---|---|
| | | | Initial | 1 hr. | |
| None (blank) | 0 | 145 | 70.5 | 68 | 0.3 |
| 3.6% Solid CaCl₂ | 0 | 148 | 70.5 | 69.5 | 0.2 |
| 6.5% of 50% Aqueous CaCl₂ | 0 | 161 | 70.5 | 69.5 | 0.4 |

[1] Marsh viscosity.
[2] The initial weight is the density of the fluid in lbs./cu. ft. The 1-hr. weight is determined by allowing the fluid to settle for 1 hour and then measuring the density of a sample skimmed from the upper surface of the fluid. A comparison of the initial and 1-hr. weights provides an accurate measure of the rate at which suspended solids settle out of the fluid.

It will be noted from these data that the addition of calcium chloride to a typical oil-base drilling fluid as provided by the invention does not materially affect various physical properties of the fluid. The fluid loss is not increased nor is the viscosity unduly changed, particularly where the treatment is effected with solid calcium chloride. Similarly the settling rate is, if anything, improved and the gel strength is relatively unchanged.

Other modes of applying the principle of my invention may be employed, changes being made in the methods and materials employed provided the step or steps stated by any of the following claims, or the equivalent of such stated step or steps, be employed.

I, therefore, particularly point out and distinctly claim as my invention:

1. The method of removing water from a water-contaminated oil-base drilling fluid containing suspended solids, which comprises admixing with said fluid a water-soluble alkaline earth metal salt, allowing the fluid to stand to settle out water and suspended solids, and thereafter separating the settled water and solids from the remainder of the fluid.

2. The method of removing water from a water-contaminated oil-base drilling fluid containing suspended solids, which comprises admixing with said fluid a solid water-soluble alkaline earth metal salt, allowing the fluid to stand to settle out water and suspended solids, and thereafter separating the settled water and solids from the remainder of the fluid.

3. The method of removing water from a water-contaminated oil-base drilling fluid containing suspended solids, which comprises admixing calcium chloride with said fluid, allowing the fluid to stand to settle out water and suspended solids, and thereafter separating the settled water and solids from the remainder of the fluid.

4. The method of removing water from a water-contaminated oil-base drilling fluid containing suspended solids, which comprises admixing solid calcium chloride with said fluid, allowing the fluid to stand to settle out water and suspended solids, and thereafter separating the settled water and solids from the remainder of the fluid.

5. The method of removing water from a water-contaminated oil-base drilling fluid containing suspended solids, which comprises admixing with said fluid from about 0.5 to about 10 per cent by weight thereof of a water-soluble alkaline earth metal salt, allowing the fluid to stand to settle out water and suspended solids, and thereafter separating the settled water and solids from the remainder of the fluid.

6. The method of removing water from a water-contaminated oil-base drilling fluid containing suspended solids, which comprises admixing with said fluid from about 0.5 to about 10 per cent by weight thereof of a solid water-soluble alkaline earth metal salt, allowing the fluid to stand to settle out water and suspended solids, and thereafter separating the settled water and solids from the remainder of the fluid.

7. The method of removing water from a water-contaminated oil-base drilling fluid containing suspended solids, which comprises admixing with said fluid from about 0.5 to about 10 per cent by weight thereof of a water-soluble alkaline earth metal salt in the form of an aqueous solution of at least about 40 per cent by weight concentration, allowing the fluid to stand to settle out water and suspended solids, and thereafter separating the settled water and solids from the remainder of the fluid.

8. The method of removing water from a water-contaminated oil-base drilling fluid containing suspended solids, which comprises admixing with said fluid from about 0.5 to about 10 per cent by weight thereof of calcium chloride, allowing the fluid to stand to settle out water and suspended solids, and thereafter separating the settled water and solids from the remainder of the fluid.

9. The method of removing water from a water-contaminated oil-base drilling fluid containing suspended solids, which comprises admixing with said fluid from about 0.5 to about 10 per cent by weight thereof of solid calcium chloride, allowing the fluid to stand to settle out water and suspended solids, and thereafter separating the settled water and solids from the remainder of the fluid.

10. The method of removing water from a water-contaminated oil-base drilling fluid containing suspended solids, which comprises admixing with said fluid from about 0.5 to about 10 per cent by weight thereof of calcium chloride in the form of an aqueous solution of at least about 40 per cent by weight concentration, allowing the fluid to stand to settle out water and suspended solids, and thereafter separating the settled water and solids from the remainder of the fluid.

11. The method of removing water from a water-contaminated unweighted oil-base drilling fluid, which comprises adding to said fluid from about 2 to about 30 per cent by weight thereof of an insoluble finely-divided solid material and from about 0.5 to about 10 per cent by weight of a water-soluble alkaline earth metal salt, allowing the fluid to stand to settle out water and said solid material, and thereafter separating said water and solid material from the remainder of the fluid.

12. The method of claim 11 wherein the water-soluble alkaline earth metal salt is calcium chloride.

PAUL W. FISCHER.

REFERENCES CITED

The following references are of record in the file of this patent:

UNITED STATES PATENTS

| Number | Name | Date |
|---|---|---|
| 1,515,093 | Crites et al. | Nov. 11, 1924 |
| 1,593,893 | Barry | July 27, 1926 |
| 2,356,776 | Miller | Aug. 29, 1944 |
| 2,430,039 | Anderson | Nov. 4, 1947 |

OTHER REFERENCES

Dow: Methods Used for Dehydration of Oil Field Emulsions, page 7, Bureau of Mines Report of Investigations No. 2688, May 1925.